US011436367B2

(12) United States Patent
Subramanian et al.

(10) Patent No.: US 11,436,367 B2
(45) Date of Patent: Sep. 6, 2022

(54) PRE-OPERATING SYSTEM ENVIRONMENT-BASED SANITIZATION OF STORAGE DEVICES

(71) Applicant: HEWLETT PACKARD ENTERPRISE DEVELOPMENT LP, Houston, TX (US)

(72) Inventors: Sriram Subramanian, Bangalore (IN); Scotty M. Wiginton, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 373 days.

(21) Appl. No.: 16/799,986

(22) Filed: Feb. 25, 2020

(65) Prior Publication Data
US 2021/0264055 A1 Aug. 26, 2021

(51) Int. Cl.
*G06F 21/00* (2013.01)
*G06F 21/62* (2013.01)

(52) U.S. Cl.
CPC .. *G06F 21/6245* (2013.01); *G06F 2221/2143* (2013.01)

(58) Field of Classification Search
CPC ............. G06F 21/6245; G06F 2221/2143
See application file for complete search history.

(56) References Cited

U.S. PATENT DOCUMENTS

| 4,449,182 A | 5/1984 | Rubinson et al. |
| 7,581,118 B2 | 8/2009 | McGovern |
| 10,162,565 B2 | 12/2018 | Wang et al. |
| 10,185,509 B1* | 1/2019 | Farhan ................ G06F 3/0611 |
| 10,482,008 B2 | 11/2019 | Lee et al. |
| 10,516,533 B2 | 12/2019 | Mannan et al. |
| 2005/0289289 A1* | 12/2005 | Chang ................ G06F 21/6218 711/103 |
| 2018/0307851 A1* | 10/2018 | Lewis ..................... G06F 21/62 |
| 2018/0341773 A1* | 11/2018 | Khatri ..................... G06F 21/78 |
| 2019/0042126 A1 | 2/2019 | Sen et al. |
| 2019/0324678 A1* | 10/2019 | Griffes ............. G11B 20/00086 |
| 2020/0082103 A1* | 3/2020 | Heidinga ............ G06F 12/0253 |
| 2020/0110713 A1* | 4/2020 | Daineche ............ G06F 12/1483 |
| 2020/0250334 A1* | 8/2020 | Bandi ................ G06F 21/6245 |

OTHER PUBLICATIONS

Richard Kissel et al., "Guidelines for Media Sanitization," Dec. 2014, pp. 1-64, NIST Special Publication 800-88, Revision 1.

\* cited by examiner

*Primary Examiner* — Shin-Hon (Eric) Chen
(74) *Attorney, Agent, or Firm* — Trop, Pruner & Hu, P.C.

(57) ABSTRACT

A technique includes, in a pre-operating system environment of a computer system, a hardware processor of the computer system executing machine executable instructions to determine whether a sanitization option was selected in a prior operating system environment of the computer system. In response to determining that the sanitization option was selected, the hardware processor executes the instructions in the pre-operating system environment to determine, for an adapter of the computer system, a storage inventory associated with the adapter and sanitize the storage inventory.

14 Claims, 7 Drawing Sheets

PRE-OPERATING SYSTEM ENVIRONMENT-BASED SANITIZATION OF STORAGE DEVICES

BACKGROUND

A computer system may receive, process and/or store sensitive data, such as data that represents personal and/or confidential information about individuals or business organizations. The sensitive data may, as examples, represent personally identifiable information (PII) (e.g., names, residence addresses, medical information, social security numbers and banking information), financial information, business plans, trade secrets, and so forth. The sensitive data may be stored in storage devices (e.g., magnetic storage drives, solid state drives (SSDs), flash memory devices, and so forth) of the computer system. Although the computer system may implement measures (e.g., access controls, virus protection software, and so forth) to prevent unauthorized access to the sensitive data, the storage devices may eventually be disposed or repurposed; and when this occurs, the measures that are used by the computer system to regulate access to the sensitive data may no longer be in place. The storage devices may be sanitized for purposes of preventing sensitive data from being recovered from the devices.

DETAILED DESCRIPTION

Figure 1:
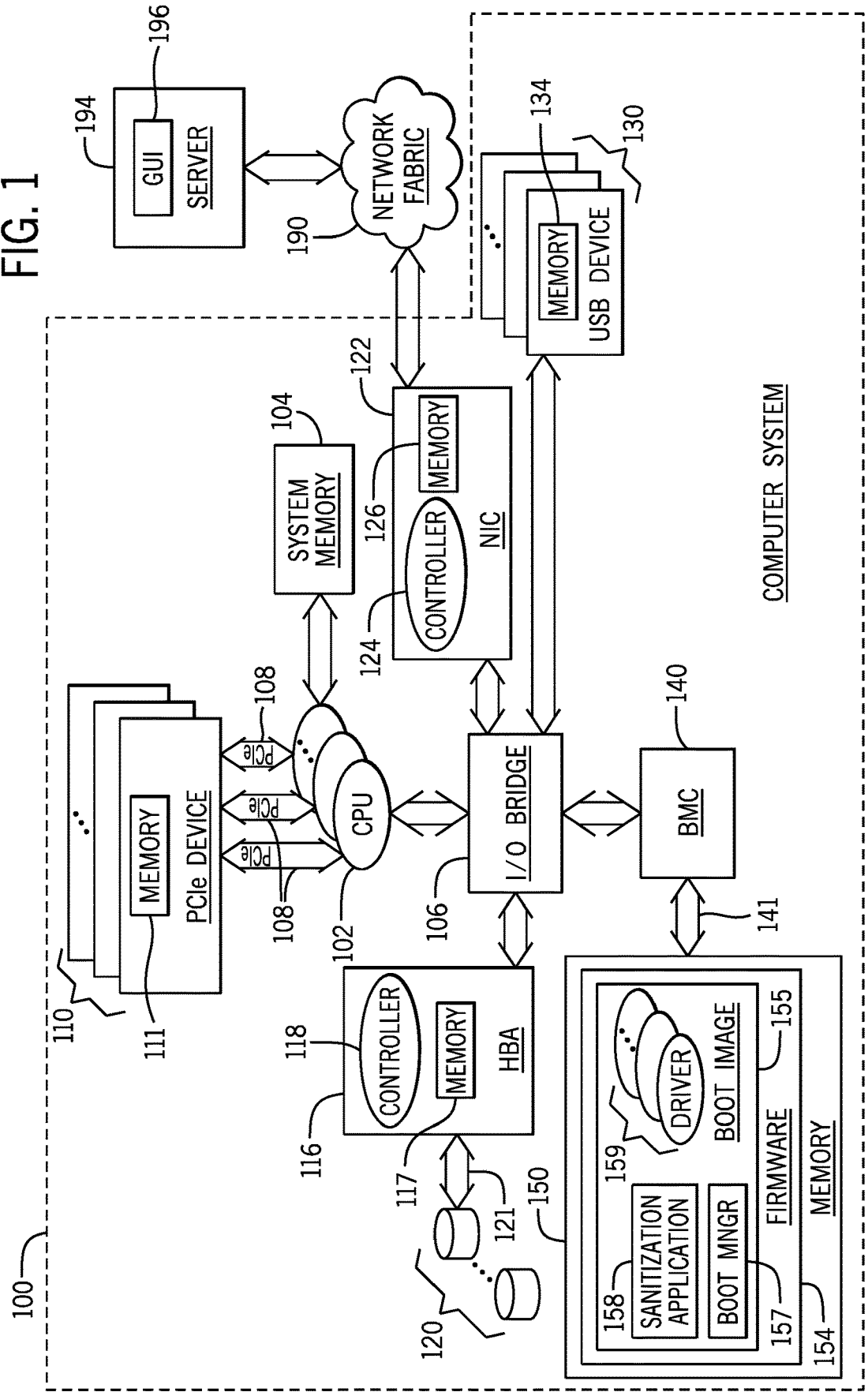
FIG. 1 is a schematic diagram of a computer system that uses pre-operating system environment-based sanitization to sanitize storage devices of the computer system according to an example implementation.

In general, "sanitization" refers to a process that may be applied to a storage device that stores target data for purposes of rendering access to the target data infeasible for a given level of effort. The one or multiple sanitization procedures that are applied to a given storage device may depend on the type, or category, of the device's storage media and on the targeted given level of effort to be rendered infeasible.

In this context, a "storage device" refers to a component that has a non-volatile storage medium or media that store data. In other words, the data remains stored in the device after power to the device has been removed. The "storage media type" refers to the particular storage technology. As examples, the storage device may be a magnetic mass storage drive, a flash memory module, a non-volatile memory self-encrypting (NVMe) drive, a solid state drive (SSD), a smart phone, a removable mass storage drive, an Advancement Technology Attachment (ATA) drive, a Serial ATA (SATA) drive, a Fibre Channel drive, a Small Computer System Interface (SCSI) drive, a Serial Attached SCSI drive, a removable Universal Serial Bus (USB) drive, and so forth. The storage media type may be any of a number of different categories corresponding to different storage technologies, such as optical, flash memory, semiconductor, memristor, phase change and magnetic storage technologies.

Sanitization, in general, refers to a procedure that is applied to a storage device to prevent the recovery of target data (e.g., sensitive data) from being recovered from the storage device. Sanitization may be contrasted to a format operation, such as a full format of a hard drive, which may involve reassigning partitions and overwriting address tables while otherwise leaving user data (including potentially sensitive data) stored on the drive intact.

A sanitization procedure may be classified according to the level of effort that is rendered infeasible by the procedure. National Institute of Standards and Technology (NIST) Special Publication 800-88, Revision 1, entitled, "Guidelines for Media Sanitization," (2014) (herein called the "NIST Publication") sets forth sanitization categories of "clear," "purge," and "destroy." For the clear sanitization category, the sanitization procedure is applied to all user-addressable storage locations of the storage device for purposes of rendering the recovery of the target data infeasible through non-laboratory techniques (e.g., techniques such as user-initiated read operations in a computer system, where the storage device is installed). In this context, a "clear sanitization procedure" refers to a procedure in which the user-addressable storage locations of a storage device are erased so that the data previously stored in those storage locations may not be recovered. As an example, a clear category sanitization procedure may involve overwriting user-addressable storage locations of the storage device with a fixed pattern of data (e.g., a pattern of "zeros") in a first pass and potentially overwriting the user-addressable storage locations of the storage device with another fixed pattern of data (e.g., a complementary pattern to the first pattern) in a second pass.

Another sanitization category described in the NIST Publication is the "purge" category, a category in which the sanitization procedure is applied to render the recovery of the target data infeasible using state of the art laboratory techniques. In this context, a "laboratory technique" may refer to a forensic technique that may be used to access data that may otherwise be inaccessible (e.g., user-initiated read operations) when the storage device is installed in a computer system. In this context, a "purge sanitization procedure" refers to a procedure in which the user-addressable and non-user-addressable storage locations of a storage device are erased so that the data previously stored in those storage locations may not be recovered. For example, due to wear leveling and/or defective memory cells, physical addresses corresponding to certain memory cells of a memory device may be mapped out of the device's logical address space. The mapped-out memory cells of the memory device, however, may store sensitive data (i.e., data stored when the cells were previously mapped into the logical address space). These mapped out memory cells may not be accessed through non-laboratory techniques. As another example, file system fragmentation for a mass storage drive may result in sensitive data being retained in locations, which are inaccessible by user read operations. Laboratory techniques may potentially be used to access this sensitive data if purge sanitization is not used.

A "cryptographic erase" is an example of a purge sanitization procedure. In a cryptographic erase, a cryptographic key, which is used to access stored encrypted data (e.g., encrypted data stored on a storage device or encrypted data stored in an adapter), is erased, or removed, from the storage device and/or adapter. Without the cryptographic key, even if the encrypted data is accessed, the corresponding plaintext data cannot feasibly be recovered.

As a more specific example, a cryptographic erase may be applied to a self-encrypting drive (e.g., a non-volatile memory express (NVMe) drive). A self-encrypting drive contains a cryptographic processor that performs encryption and decryption inside the drive so that the data stored in the drive is always encrypted. For write operations, the cryptographic processor converts plaintext data into corresponding ciphertext data, which stored in the drive, and conversely, for read operations, the cryptographic processor converts the ciphertext data into plaintext data.

A self-encrypting drive may internally store and use a media access key to encrypt and decrypt the data that is stored in the drive, and the media access key may be encrypted using a wrapping key, or "key encrypting key." By removing the media access key (i.e., by performing a cryptographic erase) from the self-encrypting drive, the recovery of data stored in the drive is rendered infeasible using state of the art laboratory techniques.

The "destroy" sanitization category defined in the NIST Publication refers to a sanitization procedure that renders recovery of target data from a storage device infeasible using state of the art laboratory techniques and also results in the inability to use the storage device for the subsequent storage of data. In this context, a "destroy sanitization procedure" refers to a procedure in which 1. the user-addressable and non-user-addressable storage locations of a storage device are erased so that the data previously stored in those storage locations may not be recovered; and 2. the storage device can no longer be used. As examples, grinding of the storage device and the incineration of the storage device are destroy sanitization procedures.

Although the clear and purge sanitization procedure categories that are defined in the NIST Publication are mentioned herein and may be used in accordance with example implementations, sanitization categories and/or sanitization procedures other than the categories/procedures mentioned in the NIST Publication may be used, in accordance with further implementations.

The specific procedures that are employed to sanitize a storage device may depend on the type, or category, of the storage device and/or storage device media. For example, for a self-encrypting drive, the clear sanitization procedure may involve overwriting the user accessible storage using at least one pass of a particular fixed data pattern, such as a pattern of all zeros. The purge sanitization procedure may involve, for example, removing the media access key of the self-encrypting drive and/or invoking a particular sanitization operation that is provided by the self-encrypting drive.

As another example, a networking device (a network interface controller, a router, a switch, and so forth) may contain non-volatile storage devices, and the clear sanitization procedure for sanitizing the non-volatile storage devices of the networking device may involve invoking a manufacturer-provided reset operation of the device to restore the device to its factory default settings. It is noted that for this example, the storage devices of the networking device may not be directly accessible, and the networking device may not otherwise provide built-in sanitization operations to erase or overwrite the networking device's memory.

As other examples, the storage device may be a hard disk drive in which a clear sanitization procedure may be performed by overwriting the device's storage media in a single pass with a fixed data pattern. For a purge sanitization procedure, sanitization functions of the hard disk drive may be invoked (e.g., invoked through sanitization-specific commands recognized by the hard disk drive) and/or a cryptographic erase may be used to remove a cryptographic key used to encrypt data stored on the hard drive. For embedded flash memory on boards and devices, the clear sanitization procedure may involve resetting the contents of the flash memory to original factory settings. The purge sanitization operation may not be available for these storage devices.

In accordance with example implementations, a cryptographic erase may also be used to remove a cryptographic key from an adapter, such as, for example, a cryptographic key that is stored in a host bus adapter.

In accordance with example implementations that are described herein, the computer system includes interfaces, or adapters, and each adapter is associated with one or multiple storage devices (herein called a "storage inventory" or "inventory"). In this context, an adapter is a hardware device that is operated or controlled by the computer system through the execution of an associated device driver. As examples, an adapter may be a host bus adapter (e.g., an adapter that provides an interface to one or multiple mass storage drives (e.g., SCSI drives, ATA drives, SATA drives, Fiber Channel drives, and so forth)); a networking device (e.g., a network interface controller, switch, router, gateway, and so forth); a non-volatile memory removable memory drive; a memory controller; and so forth.

A given adapter may be associated with a primary function other than storage, but nevertheless, the adapter may have an associated storage inventory that stores sensitive data. For example, the adapter may be a networking component (e.g., a network interface controller, a switch, a router, and so forth) that contains non-volatile memory devices.

The storage inventory that is associated with a given adapter may include storage devices that are associated with different storage media types; and different sanitization procedures may be applied to the storage devices based on their corresponding storage media types. For example, a host bus adapter may be associated with a set of hard disk drives, and the host bus adapter may also contain embedded flash memory devices. For this example storage inventory, a clear sanitization procedure for the hard disk drives may, for example, involve overwriting the storage media with a fixed pattern, and a clear sanitization procedure for the embedded flash memory devices may, for example, involve invoking an operation of the host bus adapter to restore the contents of the embedded flash memory devices to original factory settings.

As part of a computer system's lifecycle, a decision may be made to retire or repurpose the computer system. As examples, the computer system may be retired from service; may be transferred from one department of a business organization to another department of the organization; may be transferred from one business organization to another business organization; may be re-provisioned for a different purpose (e.g., re-provisioned to provide a different cloud service); and so forth. For purposes of inhibiting, if not preventing, access to sensitive data stored on the computer system's storage devices, a decision may be made to sanitize the storage devices.

In accordance with example implementations that are described herein, a sanitization option for a computer system may be selected (e.g., selected by an administrator using a remote management server) in an operating system environment of the computer system, and in response to the selection of the sanitization option, the computer system reboots (e.g., undergoes a warm power reset) and sanitizes its storage devices. In accordance with example implementations, in response to the sanitization option being selected, the computer system may undergo a warm power reset; and in the pre-operating system environment that follows the reset, the computer system, in accordance with example implementations, identifies an inventory of storage devices associated with each adapter of the system, undertakes measures to sanitize the storage devices, and reports the results of the sanitization. In this context, the "pre-operating system environment" generally refers to the startup state of the computer system, which begins when the computer system first powers up or undergoes a warm power reset and ends when the computer loads an operating system and transitions control of the computer system to the operating system. The computer system is in the "operating system environment" after the operating system is loaded and control has been transferred to the operating system. The computer system may transition from the operating system environment to the pre-operating system environment in response to a warm power reset (i.e., a reset controlled by the computer system while power remains and thus, is not removed), or in response to powering down, or shutting down, the computer system and then subsequently powering on the computer system.

In accordance with example implementations, the computer system sanitizes the storage devices by generating application programming interface (API) calls to drivers of the adapters for purposes of causing the drivers to perform certain functions. Through the API calls, the computer system may autonomously determine a list of storage devices for each adapter. The storage devices for a given adapter may, for example, include devices (e.g., drives) that are attached to the adapter as well as in the internal memory of the adapter. The computer system may also, through API calls, perform sanitization operations on the storage devices, where some of these sanitization measures may be specific to the storage media types; and through API calls, the computer system may monitor the sanitization operations. The computer system may, in accordance with example implementations provide one or multiple messages or log entries reporting the status of the sanitization completions (e.g., provide a report representing which storage devices were successfully sanitized and whether the sanitization operation(s) failed on any storage device(s)). In accordance with example implementations, the sanitization of storage devices, as described herein, may be operating system agnostic and may be performed without prior knowledge of the storage device inventory of the computer system.

As a more specific example, in accordance with some implementations, an electronic system may include one or multiple adapters, and each adapter be associated with a storage inventory of one or multiple storage devices having one or multiple storage media types. Referring to FIG. 1, in accordance with example implementations, the electronic system may be a computer system 100, such as a server; a client; a desktop computer; cloud-based computer system; a laptop computer; a tablet computer; a smartphone; a wearable computer; a rack mounted module; rack-based computer system; a system containing multiple of the foregoing components; and so forth.

In general, the computer system 100 includes non-volatile storage devices (e.g., magnetic storage devices, semiconductor storage devices, phase change memory devices, flash memory devices, and so forth) that may store sensitive data; and as described herein, the computer system 100 is constructed to autonomously perform sanitization operations on these storage devices in a pre-operating system environment in response to a sanitization option being selected.

For the example implementation that is depicted in FIG. 1, the adapters of the computer system 100 include a host bus adapter 116. The host bus adapter 116 provides an interface to one or multiple mass storage drives 120, and in addition to data being stored on the mass storage drives 120, data may also be stored in a non-volatile memory 117 of the host bus adapter 116. The host bus adapter 116 may contain non-volatile memory devices (i.e., storage devices), and the mass storage drives 120 may also be considered storage devices. The host bus adapter 116 may form a communication interface to a bus 121 (e.g., a SCSI bus, a Fibre Channel bus, an ATA bus, and so forth) to which the mass storage drives 120 are coupled. In general, the host bus adapter 116 may contain a controller 118 that provides input/output (I/O) processing. The controller 118 may, for example, respond to received commands (e.g., write commands, read commands, sanitization commands, and so forth) and initiate the appropriate cycles on the bus 121 to control the transfer of data to and from the mass storage drives 120.

The controller 118 may process commands that result in sanitization operations being performed on the mass storage drives 120 and the host bus adapter 116. For example, the controller 118 may, in accordance with some implementations, recognize and act on specific sanitization commands that initiate corresponding sanitization operations on the mass storage drives 120. As example, in a response to a specific sanitization command, the controller 118 may initiate one or multiple actions to perform the actions corresponding to the command, such as initiating block write cycles on the bus 121 to overwrite the storage media with fixed data patterns, remove a cryptographic key from the host bus adapter 116, remove cryptographic keys form the mass storage drives 120, reset the contents of the non-volatile memory 117 to a factory state, and so forth). Moreover, in accordance with example implementations, commands that are not specific to sanitization, such as block write commands, may be provided to the host bus adapter 116 for purposes of sanitizing the mass storage drives 120.

The adapters of the computer system 100 also include a networking device, such as a network interface controller 122, and/or other networking devices, such as switches bridges, gateways, and so forth. The network interface controller 122 may contain a controller 124 and a non-volatile memory 126. Although the non-volatile memory 126 may not be directly accessible for purposes of overwriting the contents of the memory 126, the controller 124 may execute specific sanitization commands, such as, for example, a sanitization command to restore settings of the network interface controller 122 to a factory state.

The computer system 100 may contain various other storage adapters that have associated storage inventories, such as, for example, Peripheral Component Interconnect (PCIe) devices 110 (e.g., PCIe-based NVMe drives), which may be installed in corresponding slot connectors and contain non-volatile memories 111. As another example of an adapter that has an associated storage inventory, the computer system 100 may include one or multiple USB devices 130 (e.g., USB drives), which may have one or multiple corresponding non-volatile memories 134.

In general, the computer system 100 may contain one or multiple "hardware processors" (also called "processors" herein). A given hardware processor may include one or multiple central processing units (CPUs) 102 (e.g., CPU processing cores, semiconductors containing CPU processor cores) that, as depicted in the example implementations of FIG. 1, may be coupled to the PCIe devices 110 through corresponding PCIe links 108. Moreover, the CPU(s) 102 may be connected to a system memory 104 and to an I/O bridge 106. In accordance with example implementations, the memory devices that form the system memory 104 may be volatile memory devices that are formed from non-transitory memory devices, such as semiconductor storage devices, memristors, phase change memory devices, a combination of one or more of the foregoing storage technologies, and so forth. In accordance with some implementations, the system memory 104 may be formed from dynamic random access memory (DRAM) devices.

As also depicted in FIG. 1, in accordance with example implementations, the I/O bridge 106 may also be coupled to a baseboard management controller 140, which, in turn, may be coupled to a remote management server 194 via network fabric 190. In accordance with example implementations, the remote management server 194 may contain one or multiple CPUs/CPU processing cores that execute machine executable instructions to provide a management graphical user interface (GUI) 196 on the server 194; and a user, such as an administrator, may, through interaction with the GUI 196, select a sanitization option to sanitize all of the storage devices of the computer system 100. The remote management server 194 may communicate (via a REpresentational State Transfer (REST) API calls, for example) with the baseboard management controller 140 to inform the computer system 100 as to the selection of the sanitization option as well as to manage other aspects of the computer system 100. In accordance with example implementations, the baseboard management controller 140, in response to the sanitization option being selected, transitions the computer system 100 to a warm power reset and enables the computer's firmware-based sanitization process (as described further herein) to be performed as part of the boot of the computer system 100 due to the reset.

As used herein, a "baseboard management controller" is a specialized service processor that monitors the physical state of a server or other hardware using sensors and communicates with a management system through a management network. The baseboard management controller may also communicate with applications executing at the operating system level through an input/output controller (IOCTL) interface driver, a REST API, or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In general, in response to a warm reset or power on, the computer system 100 enters a pre-operating system environment and undergoes a boot (or "boot up") to start up the computer system 100. The startup of the computer system may include such operations as validating and loading machine executable instruction components (i.e., "software" components) of the computer system 100; configuring components of the computer system 100; and testing components of the computer system 100. In accordance with some implementations, a boot image 155 may be part of firmware 154 that is stored in a non-volatile memory 154 (e.g., a flash memory) of the computer system 100, and in response to the power on or warm reset of the computer system, the baseboard management controller 140 may validate the boot image 155 and initiate the transfer of the boot image 155 into the system memory 104 for execution by a boot CPU 102.

As depicted in FIG. 1, in accordance with example implementations, the boot image 155 includes a boot manager 157, which the boot CPU 102 executes to test and configure components of the computer system 100. In accordance with an example implementation, the execution of the boot manager 157 causes the computer system 100 to undergo a secure boot, such as a secure boot as set forth in the Unified Extensible Firmware Interface (UEFI) Specification, Version 2.8, UEFI Forum, Inc. (March 2019). In the secure boot, the computer system 100 may validate software components, load the software components after validation, and execute the software components. For example, in accordance with an example implementation in which a PCIe device 110 is a removable option card, as part of the secure boot, the boot CPU 102 may validate code stored in an option read only memory (ROM) of the card and if the code is validated, execute the code to configured the PCIe device 110. The boot CPU 102 may, at the conclusion of the secure boot, validate and load (if validated) an operating system bootloader. The boot CPU 102 executes the operating system bootloader to load operating system code so that at the conclusion of the boot, control may be handed to the operating system.

In accordance with further implementations, the computer system 100 may undergo an UEFI secure boot other than the secure boot defined in Version 2.8 of the UEFI specification, may undergo a secure boot other than an UEFI secure boot, and may undergo a boot that is not a secure boot.

In accordance with example implementations, the boot image 155 includes a sanitization application 158 (e.g., an Extensible Firmware Interface (EFI) application), which is executed in a warm reset boot of the computer system 100, if the storage sanitization option has been selected. The boot image 155 may also include drivers 159 (e.g., executable EFI images) for corresponding adapters of the computer system 100. It is noted that computer system 100 may store a driver for a given adapter in a location other than the memory 150, which may be the case, for example, when the driver is loaded from an PCIe option card.

In accordance with some implementations, the sanitization application 158 (when executed in the pre-operating system environment) makes API calls to drivers for the adapters to invoke sanitization procedures, or functions, that are handled by the drivers. In general, an API is an abstraction that defines procedures, or functions, such as the sanitization functions that are described herein; and each driver (e.g., a driver provided by a manufacturer of the adapter) is specifically constructed to control how the functions are performed, taking into account the specific interface and communication protocol of the adapter.

As examples, in accordance with example implementations, an API may define the following sanitization functions, which are performed by the drivers in response to the corresponding API calls. The sanitization functions, in accordance with example implementations include a Reset-Adapter function, which causes the driver to reset a configuration state of the corresponding adapter to a factory default state; a GetAdapterStorageList function, which causes the driver to provide a list, or inventory, of the storage devices that are associated with the corresponding adapter, including the storage media type(s) of the storage devices; and a SanitizeMedia function. The SantizeMedia function, in accordance with example implementations, may be used to either cause the driver to perform a cryptographic key erase or perform a media type specific erase operation. The sanitization functions may also include a MonitorSanitizeStatus function, which causes the driver to return a completion status. For example, in accordance with example implementations, for a certain group of storage device(s), such as the storage device(s) that have the same media type, the status may be whether the sanitization is still ongoing, the sanitization is one hundred percent complete, or the sanitization failed.

As noted above, the sanitization functions that are performed by the drivers may be part of a protocol of functions defined by an API specification. Each driver handles the task of controlling the specific hardware of the corresponding adapter to perform the sanitization functions. In other word, the API defines what the functions are to do, and each driver controls how the function is performed with a corresponding specific adapter. An API specification may assign an identifier to a protocol that is defined by the specification, such as a globally unique identifier (GUID). In accordance with example implementations, a driver that implements a protocol that performs the sanitization functions that comply with the API specification, publishes (in memory) an instance of a protocol interface that is identified by the GUID and contains pointers to the sanitization functions. The computer system may therefore search for the specific GUID in the protocol interfaces that are published by drivers for purposes of identifying drivers that implement the sanitization functions and identifying adapters that correspond to these drivers.

Figure 2:
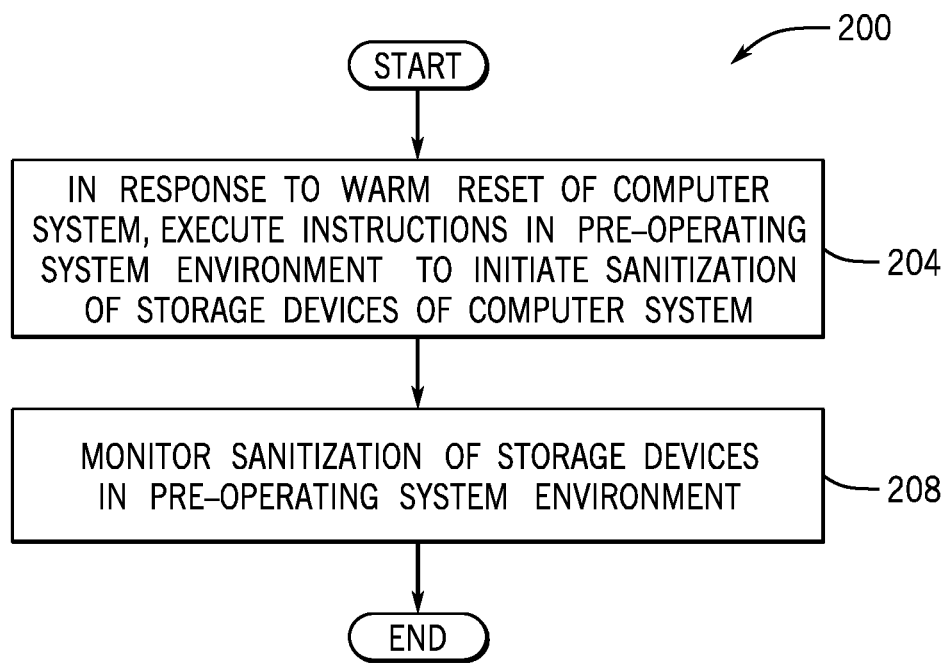
FIG. 2 is a flow diagram depicting a pre-operating system environment-based sanitization process according to an example implementation.

FIG. 2 is a flow diagram generally depicting a process 200 to sanitize storage devices of the computer system 100 in accordance with some implementations. In general, the process 200 may be performed by one or multiple CPUs 102 executing the sanitization application 158 and executing the drivers 159 (i.e., the process 200 may be performed by a hardware processor of the computer system 100 (FIG. 1) executing machine executable instructions). Moreover, the process 200 is performed in response to the sanitization option being selected.

Referring to FIG. 2 in conjunction with FIG. 1, in accordance with example implementations, in response to a warm reset of the computer system 100, instructions are executed (block 204) in a pre-operating system environment of the computer system 100 to initialize sanitization of storage devices of the computer system. Pursuant to block 208, also, in the pre-operating system environment, the computer system monitors the sanitization of the storage devices.

Figure 3A:
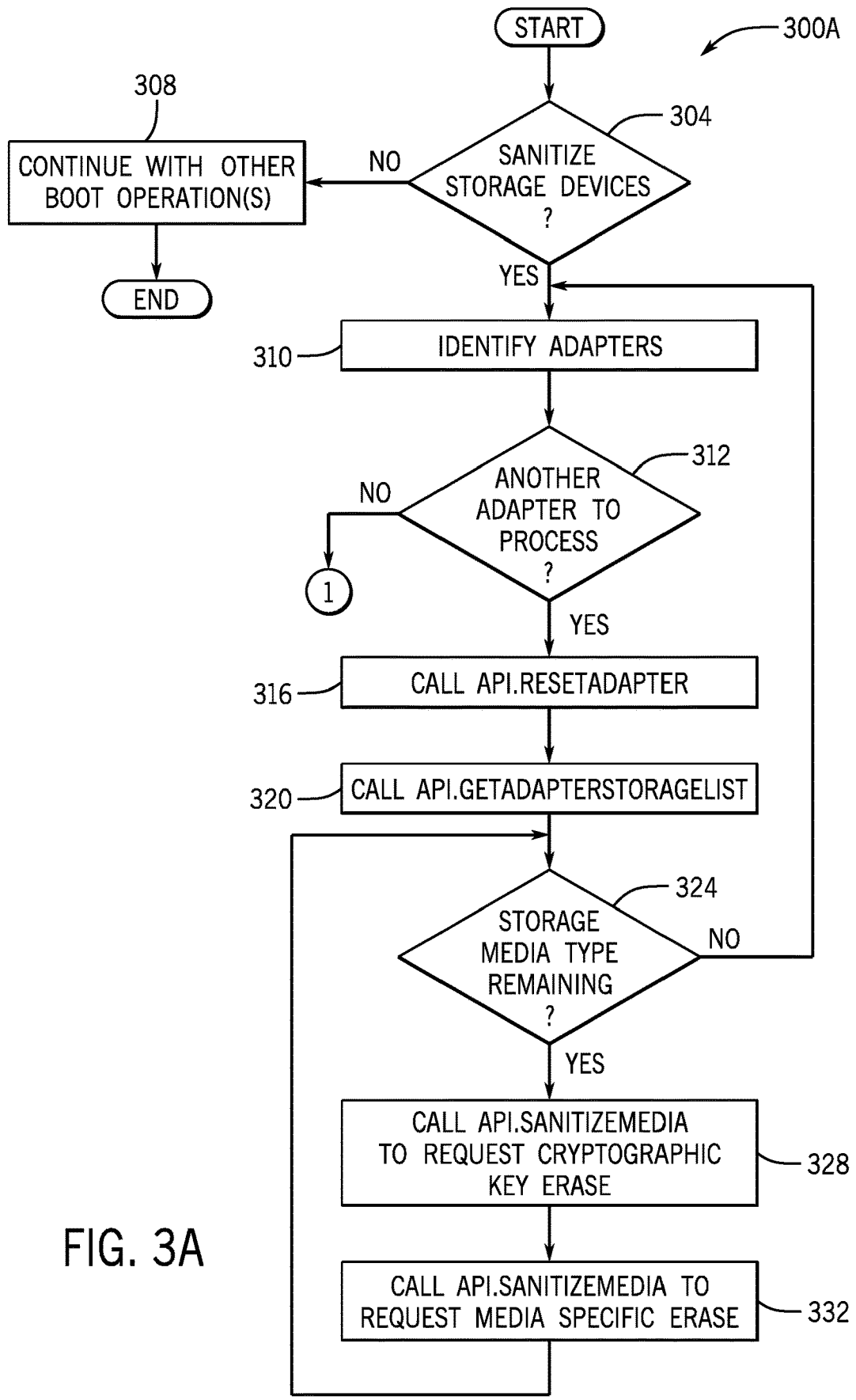
FIGS. 3A and 3B depict a flow diagram illustrating a pre-operating system environment-based process to sanitize storage devices of a computer system and monitor the sanitization according to an example implementation.
Figure 3B:
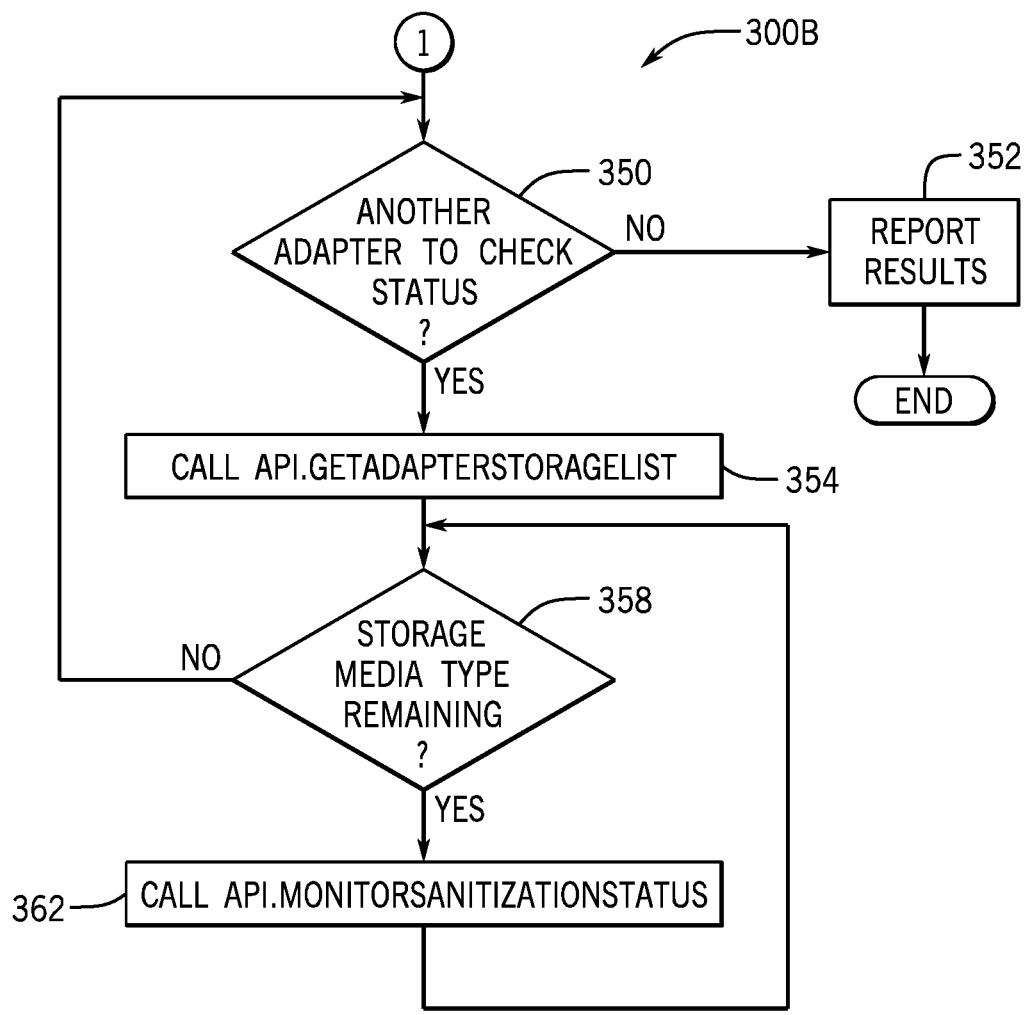

FIG. 3A depicts a process 300A (FIG. 3A) to perform relatively short-term sanitization operations and initiate relatively longer-term sanitization operations; and FIG. 3B depicts a process 300B (FIG. 3B) to monitor and report the status of the relatively longer-term sanitization operations. In general, the processes 300A and 300B 200 may be performed by one or multiple CPUs 102 executing the sanitization application 158 and executing the drivers 159 (i.e., the processes 300A and 300B may be performed by a hardware processor of the computer system 100 (FIG. 1) executing machine executable instructions).

Referring to FIG. 3A in conjunction with FIG. 1, in accordance with example implementations, in response to a warm reset of the computer system 100, the computer system 100 determines (decision block 304) whether the storage devices of the computer system 100 are to be sanitized. In this manner, in accordance with example implementations, decision block 304 may be performed by examining a register bit or other storage location to indicate whether the sanitization option has been selected, and if so, the sanitization application 158 may be called (to perform the operation as described herein with respect to FIGS. 3A and 3B). If the sanitization option has not been selected, then the computer system 100 continues with other boot operations, pursuant to block 308. Otherwise, if the sanitization option has been selected, the computer system 100 executes the sanitization application 158. Pursuant to executing the sanitization application 158, the computer system 100 may perform the following actions.

In accordance with example implementations, to begin the sanitization process, the computer system 100 identifies (block 310) the adapters of the computer system 110. In accordance with example implementations, the computer system 100 may identify the adapters by reviewing the protocols that are published by drivers of the computer system 100 for purposes of identifying protocols that are associated with a predefined GUID. The computer system next proceeds to sanitize the storage inventory for each of the identified adapters. More specifically, pursuant to decision block 312, the computer system 100 determines whether there is another adapter to process, and if so, the computer system 100 begins processing the associated storage inventory (i.e., the associated storage devices) for the adapter. If the computer system 100 determines that there is another adapter to process, pursuant to block 316, the computer system 100 performs a relatively short term sanitization operation: the computer system 100 makes an API call to the reset adapter function of the driver (where the "API" prefix to the function in block 316 and the API prefix to the functions to the other functions in other blocks of FIGS. 3A and 3B represents that an API call to a driver is being made to invoke the function). In accordance with some implementations, the resetting of the adapter resets the configuration of the adapter to its default factory-installed state.

Next, as depicted in block 320, the computer system 100 generates an API call to the GetAdapterStorageList function of the driver to obtain an inventory, or list, of all of the storage devices associated with the adapter. In accordance with example implementations, in response to this API call, the driver returns a list of all the storage devices and their associated storage media types (i.e., the driver returns a list of the storage inventory associated with the adapter). For example, referring back to FIG. 1, for the host bus adapter 116, this API call results in the driver for the host bus adapter 116 identifying the mass storage devices, as well as identifying the embedded memory 117 of the host bus adapter 116.

Beginning in decision block 324, the computer system 100 next begins a process to sanitize the storage media identified in the returned storage list. More specifically, if, pursuant to decision block 324, the computer system 100 determines that there are storage devices associated with an unprocessed storage media type remaining, then, pursuant to block 328, the computer system 100 generates an API call to the SanitizeMedia function of the driver to request a cryptographic key erase, or removal, from the storage device(s) associated with the storage media type. Moreover, pursuant to block 332, the computer system 100 generate san API call to the SanitizeMedia function to request a media specific erase, which is a relatively longer sanitization operation. As examples, in accordance with some implementations, the implementation of block 332 may include issuing a specific sanitization command recognized by the adapter, overwriting media of the storage device, and so forth, as handled by the driver.

As depicted in FIG. 3A, when a determination is made (decision block 312) that no more adapters are to be processed (i.e., all sanitization procedures for the storage devises of the computer system 100 have been initiated), then the computer system 100 transitions to a process 300B (FIG. 3B) to monitor the initiated longer term sanitization operations and report the corresponding results.

More specifically, referring to FIG. 3B in conjunction with FIG. 1, in accordance with example implementations, the computer system 100 determines (decision block 350) whether the status of another adapter is to be determined. In this manner, a given adapter is to be no longer checked when the adapter reports that all of its sanitization operations have completed or failed. As long as sanitization operation(s) are ongoing, the status is checked. If there are no more adapters to check, as depicted in FIG. 3B, the results are reported, pursuant to block 352. As an example, in accordance with some implementations, the reporting of the results may involve generating a message to a user, such as an administrator on the remote management server 194; generating a log of the results; and so forth. From these results, the administrator may determine whether or not the sanitization of the computer system's storage devices is successful, and if partially successful, the administrator may be able to identify specific storage device(s) in which sanitization was not completed but failed.

If, according to decision block 350, there is another adapter to check, then, in accordance with example implementations, the computer system 100 generates (block 354) an API call to the GetAdapterStorageList function of the driver to obtain the inventory, or list, of storage devices for the particular adapter being processed. If the computer system 100 determines (decision block 358) that there is a storage media type remaining for the current adapter being processed (i.e., the computer system 100 determines that sanitization operations for the storage device(s) having a particular storage media type are still ongoing), then the computer system 100 generates (block 362) an API call to the MonitorSanitizationStatus function of the driver to obtain the status of the sanitization operations being performed for the corresponding storage device(s).

Figure 4:
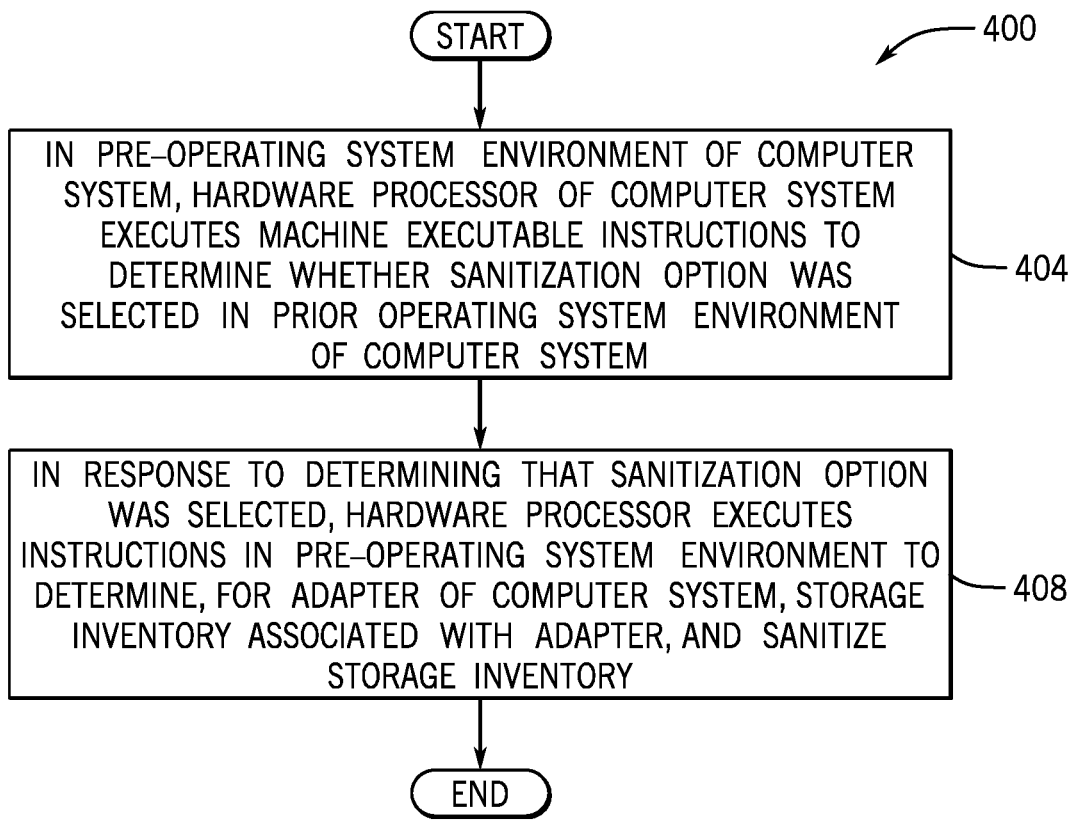
FIG. 4 is a flow diagram depicting a pre-operating system environment-based technique to sanitize a storage inventory associated with an adapter according to an example implementation.

Referring to FIG. 4, in accordance with example implementations, a technique 400 includes, in a pre-operating system environment of a computer system, a hardware processor of the computer system executing (block 404) machine executable instructions to determine whether a sanitization option was selected in a prior operating system environment of the computer system. Pursuant to block 408, in response to determining that the sanitization option was selected, the hardware processor executes the instructions in the pre-operating system environment to determine, for an adapter of the computer system, a storage inventory associated with the adapter and sanitize the storage inventory.

Figure 5:
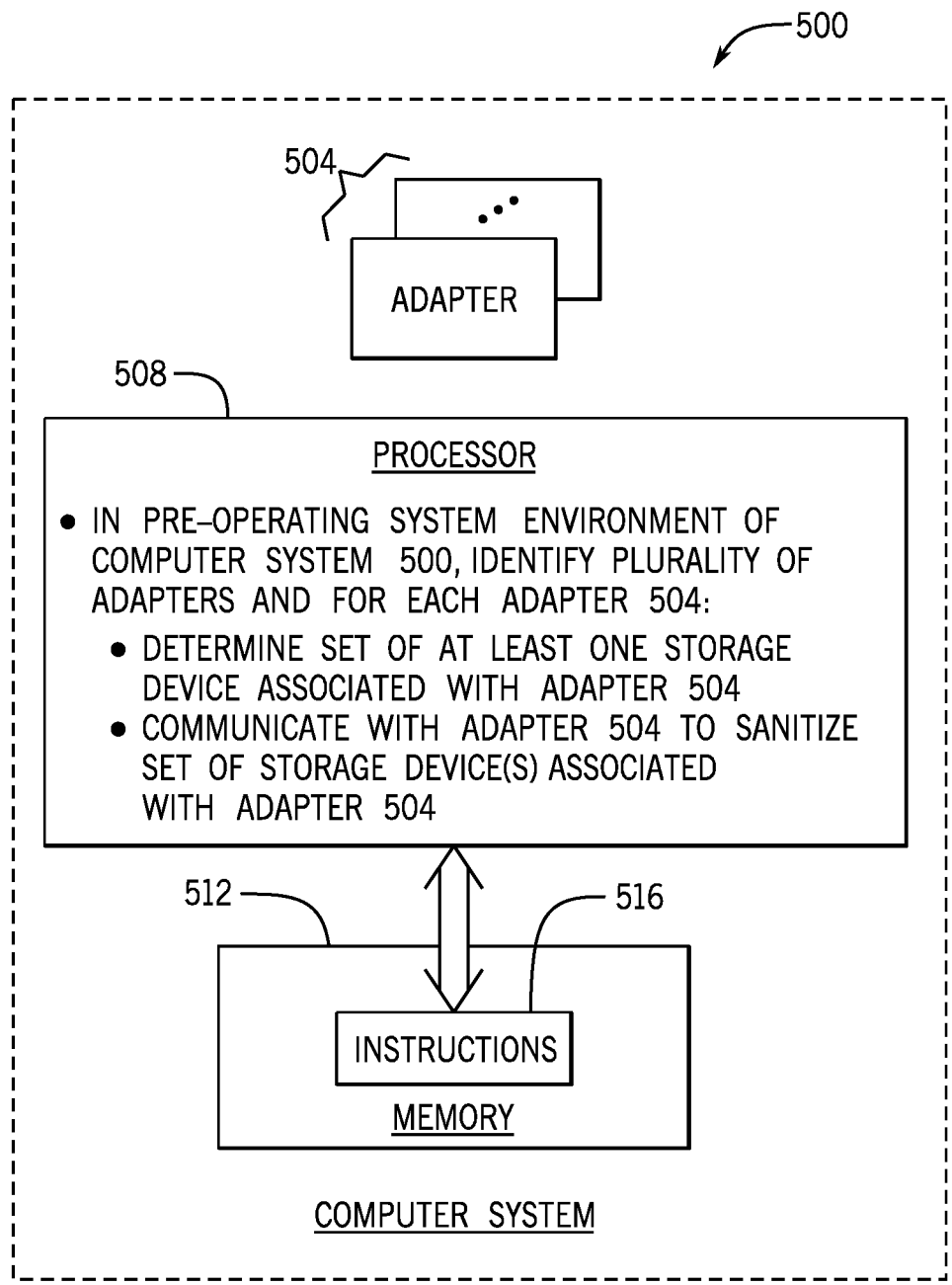
FIG. 5 is a schematic diagram of a computer system having a memory that stores instructions to, in a pre-operating system environment, sanitize storage devices associated with adapters of the computer system according to an example implementation.

Referring to FIG. 5, in accordance with example implementations, a computer system 500 includes a plurality of adapters 504; a processor 508; and a memory 512. The memory 512 stores instructions 516 that, in a pre-operating system environment of the computer system 500, cause the processor 508 to identify the adapters 504; and for each adapter 504, determine a set of at least one storage device associated with the adapter 504, and communicate with the adapter 504 to sanitize the set of storage device(s) associated with the adapter 504.

Figure 6:
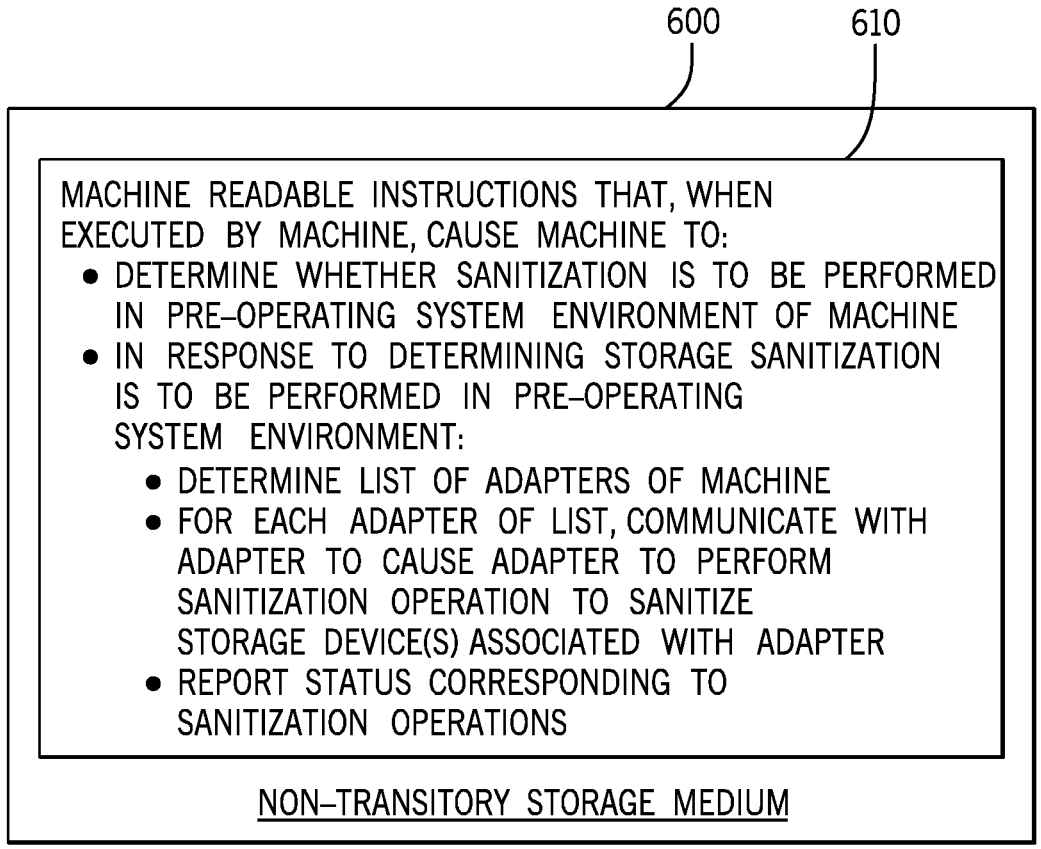
FIG. 6 is an illustration of machine readable instructions that are stored on a non-transitory storage medium, which, when executed by a machine in a pre-operating system environment, cause the machine to sanitize storage devices associated with storage controllers of the machine and report a status of the sanitization operations according to an example implementation.

Referring to FIG. 6, in accordance with example implementations, a non-transitory storage medium 600 stores machine readable instructions 610 that, when executed by a machine, cause the machine to, determine whether storage sanitization is to be performed in a pre-operating system environment of the machine. The instructions, when executed by the machine, further cause the machine to, in response to determining that storage sanitization is to be performed in the pre-operating system environment, determine a list of adapters of the machine; for each adapter of the list, communicate with the adapter to cause the adapter to perform a sanitization operation to sanitize one or multiple storage devices associated with the adapter; and report a status corresponding to the sanitization operations.

In accordance with an example implementation, the storage inventory identifies a storage device associated with a corresponding storage media type; and the hardware processor executing the instructions to sanitize the storage inventory includes generating an API call to cause a driver associated with the adapter to control the adapter to perform a sanitization function specific to the storage media type. A particular advantage of this technique is that the driver may tailor the sanitization to the specific adapter and specific media type.

In accordance with an example implementation, the storage inventory may include a plurality of storage devices and the hardware processor may execute the instructions to generate an API call to cause a driver associated with the adapter to sanitize the plurality of storage devices. A particular advantage of this technique is that the driver may tailor the sanitization to a specific adapter and multiple storage devices associated with the adapter.

In accordance with an example implementation, the hardware processor may execute the instructions to generate an API call to cause a driver associated with the adapter to provide a list of storage devices associated with the adapter. A particular advantage of this technique is that the driver may tailor a storage inventory request to a specific adapter.

In accordance with an example implementation, the hardware processor may execute the instructions to identify the adapter based on an identifier in a protocol interface published by a driver of the adapter. An advantage of this identification is that drivers that comply with an API may be readily identified.

In accordance with an example implementation, the hardware processor may execute the instructions to generates an API call to cause a driver associated with the adapter to reset a configuration state of the adapter. A particular advantage of this technique is that the driver may tailor the reset of the configuration to a specific adapter.

In accordance with an example implementation, the hardware processor may execute the instructions to generate an API call to cause a driver associated with the adapter to perform at least one of removing a cryptographic key from the adapter or removing a cryptographic key from a storage device that is attached to the adapter. A particular advantage of this technique is that the driver may tailor the removal of the cryptographic key to a specific adapter and/or storage device.

In accordance with an example implementation, the firmware instructions may be executed to monitor a sanitization operation performed by the adapter. A particular advantage of this arrangement is that firmware may control the entire sanitization process, thereby simplifying sanitization of computer system storage.

In accordance with an example implementation, an API call may be generated to cause a driver associated with the adapter to return a status of the sanitization operation. A particular advantage of this technique is that the driver may tailor a status request to a specific adapter.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   in a pre-operating system environment of a computer system, a hardware processor of the computer system executing machine executable instructions to determine whether a sanitization option was selected in a prior operating system environment of the computer system; and
   in response to the determining that the sanitization option was selected, the hardware processor executing the instructions in the pre-operating system environment to:
      determine, for an adapter of the computer system, a storage inventory associated with the adapter; and
      sanitize the storage inventory, wherein the storage inventory identifies a storage device associated with a corresponding storage media type, by generating an application programming interface (API) call to cause a driver associated with the adapter to control the adapter to perform a sanitization function specific to the storage media type,
   wherein sanitization function comprises at least one of:
      reset a configuration state of the adapter;
      perform at least one of removing a cryptographic key from the adapter or removing a cryptographic key from the storage device attached to the adapter; or
      overwrite storage media of the storage device with a predetermined data pattern.

2. The method of claim 1, wherein the storage inventory comprises identifies a plurality of storage devices, the method further comprising:
   the hardware processor executing the instructions to cause the driver associated with the adapter to sanitize the plurality of storage devices.

3. The method of claim 1, wherein the hardware processor executing the instructions to identify the storage inventory comprises the hardware processor executing the instructions to generate a second application programming interface (API) call to cause a second driver associated with the adapter to provide a list of storage devices associated with the adapter.

4. The method of claim 1, further comprising:
   the hardware processor executing the instructions to identify the adapter based on an identifier in a protocol interface published by another driver of the adapter.

5. The method of claim 1, further comprising:
   executing the instructions in the pre-operating system environment to monitor a sanitization operation performed by the adapter.

6. The method of claim 5, wherein executing the instructions to monitor the sanitization operation comprises generating a second application programming interface (API) call to cause a second driver associated with the adapter to return a status of the sanitization operation.

7. The method of claim 1, further comprising:
   in an operating system environment, selecting an option to represent that storage of the computer system is to be sanitized during a subsequent reboot of the computer system; and
   initiating the hardware processor executing the instructions in response to the option being selected and the computer system being booted.

8. The method of claim 7, wherein selecting the option comprises receiving input from a user interface of a server, the method further comprising:
   a baseboard management controller of the computer system receiving data from the server representing the selection of the option.

9. A computer system comprising: a plurality of adapters;
   a processor; and
   a memory to store instructions that, in pre-operating system environment of computer system, cause the processor to:
   determine whether a sanitization option was selected in a prior operating system environment;
   in response to the determination of the sanitization option being selected:
   identify the plurality of adapters; and
      for each adapter of the plurality of adapters:
         determine a set of at least one storage device associated with the respective adapter; and
         communicate with the respective adapter to sanitize the set of at least one storage device associated with the respective adapter based on sanitization function specific to storage media type of the at least one storage device,
   for each adapter of the plurality of adapters, generate a n application programming interface (API) call to cause an extensible firmware interface (EFI) driver associated with the adapter to identify the set of at least one storage device,
   wherein the sanitization function comprises at least one of:
      reset a configuration state of the adapter;
      perform at least one of removing a cryptographic key from the adapter or removing a cryptographic key from the storage device attached to the adapter; or overwrite storage media of the storage device with a predetermined data pattern.

10. The computer system of claim 9, wherein the plurality of adapters comprises at least one of a host bus adapter, a memory controller, or a networking device.

11. The computer system of claim 9, wherein the instructions, when executed by the processor, further cause the processor to determine the set of at least storage device for each adapter and communicate with each adapter prior to transfer of control of the computer system to an operating system.

12. A non-transitory storage medium that stores machine readable instructions that, when executed by a machine, cause the machine to:
 determine whether storage sanitization is to be performed in a pre-operating system environment of the machine;
 in response to determining that storage sanitization is to be performed in the pre-operating system environment:
  determine a list of adapters of the machine;
  for each adapter of the list of adapters, communicate with the respective adapter to cause the respective adapter to perform a sanitization operation to sanitize one or multiple storage devices associated with the respective adapter, wherein the sanitization operation is specific to storage media type of the at least one or multiple storage devices,
  for each adapter of the list of adapters, generate an application programming interface (API) call to cause an extensible firmware interface (EFI) driver associated with the adapter to identify the at least one or multiple storage devices,
  wherein the sanitization operation comprises at least one of:
   reset a configuration state of the adapter;
   perform at least one of removing a cryptographic key from the adapter or removing a cryptographic key from the storage device attached to the adapter; or
   overwrite storage media of the storage device with a predetermined data pattern; and
  report a status of the sanitization operations.

13. The storage medium of claim 12, wherein the instructions, when executed by the machine, further cause the machine to reset configuration settings of each adapter of the plurality of adapters.

14. The storage medium of claim 12, wherein the sanitization operations comprise operations to clear or purge data.

* * * * *